US008701816B2

(12) United States Patent
Saitoh

(10) Patent No.: US 8,701,816 B2
(45) Date of Patent: Apr. 22, 2014

(54) OCCUPANT DETECTION SENSOR INCLUDING A BENT PORTION AND A STRESS ABSORBING PORTION AND METHOD OF MANUFACTURING THE SAME

(75) Inventor: Yukihiro Saitoh, Tokoname (JP)

(73) Assignee: Denso Corporation, Kariya (JP)

( * ) Notice: Subject to any disclaimer, the term of this patent is extended or adjusted under 35 U.S.C. 154(b) by 366 days.

(21) Appl. No.: 13/136,433

(22) Filed: Aug. 1, 2011

(65) Prior Publication Data

US 2012/0031685 A1 Feb. 9, 2012

(30) Foreign Application Priority Data

Aug. 6, 2010 (JP) ................................. 2010-177745
Mar. 3, 2011 (JP) ................................. 2011-46542

(51) Int. Cl.
| | |
|---|---|
| *B60R 21/015* | (2006.01) |
| *G01G 19/12* | (2006.01) |
| *G01G 19/52* | (2006.01) |
| *G01G 23/02* | (2006.01) |
| *B60N 2/44* | (2006.01) |
| *G01L 1/04* | (2006.01) |
| *A47C 31/00* | (2006.01) |
| *A47C 7/62* | (2006.01) |
| *H01H 13/16* | (2006.01) |
| *H01R 4/18* | (2006.01) |

(52) U.S. Cl.
USPC ........... 180/273; 177/136; 177/144; 280/735; 340/667

(58) Field of Classification Search
USPC ................... 177/136, 144; 180/273; 280/735; 340/667
See application file for complete search history.

(56) References Cited

U.S. PATENT DOCUMENTS

| | | | | |
|---|---|---|---|---|
| 5,990,799 | A | * | 11/1999 | Boon et al. ..................... 340/667 |
| 6,609,752 | B2 | * | 8/2003 | Inoue .......................... 297/217.3 |
| 6,953,224 | B2 | * | 10/2005 | Seto et al. ................... 297/217.3 |
| 7,043,997 | B2 | * | 5/2006 | Mattson et al. ................. 73/800 |
| 7,500,536 | B2 | * | 3/2009 | Bulgajewski et al. ......... 180/273 |
| 7,598,881 | B2 | * | 10/2009 | Morgan ........................ 340/667 |
| 2002/0093236 | A1 | | 7/2002 | Inoue | |
| 2003/0020593 | A1 | | 1/2003 | Ito et al. | |

(Continued)

FOREIGN PATENT DOCUMENTS

| | | |
|---|---|---|
| JP | 2001-294067 | 10/2001 |
| JP | 2002-211297 | 7/2002 |

(Continued)

OTHER PUBLICATIONS

Office Action issued Dec. 25, 2012 in corresponding Japanese Application No. 2011-046542 with English translation.

(Continued)

*Primary Examiner* — Randy W Gibson
(74) *Attorney, Agent, or Firm* — Harness, Dickey & Pierce, PLC

(57) ABSTRACT

An occupant detection sensor includes a sensor member disposed on a surface of a vehicle seat and detecting sitting of an occupant, a wiring member electrically coupling the sensor member with an external device, and a covering member covering the sensor member and the wiring member. The wiring member and the covering member are included in a coupling section that is disposed along the surface of the vehicle seat. The coupling section includes a bent portion and a stress absorbing portion that absorbs stress generated at the bent portion.

17 Claims, 13 Drawing Sheets

(56) References Cited

U.S. PATENT DOCUMENTS

| | | |
|---|---|---|
| 2006/0278513 A1 | 12/2006 | Kawahira et al. |
| 2008/0053798 A1 | 3/2008 | Kawahira et al. |
| 2009/0107258 A1 | 4/2009 | Saitoh et al. |
| 2009/0120776 A1 | 5/2009 | Kawahira et al. |
| 2009/0127089 A1 | 5/2009 | Kawahira et al. |
| 2009/0152091 A1 | 6/2009 | Kawahira et al. |
| 2011/0024279 A1 | 2/2011 | Kawahira et al. |

FOREIGN PATENT DOCUMENTS

| | | |
|---|---|---|
| JP | 2005-152426 | 6/2005 |
| JP | 2005-233845 | 9/2005 |
| JP | 2008-51592 | 3/2008 |
| JP | 2009-128153 | 6/2009 |

OTHER PUBLICATIONS

Office Action dated Jul. 10, 2012 in corresponding Japanese Application No. 2011-046542 with English translation.

Office action dated Sep. 4, 2013 in corresponding Chinese Application No. 201110227856.9.

* cited by examiner

OCCUPANT DETECTION SENSOR INCLUDING A BENT PORTION AND A STRESS ABSORBING PORTION AND METHOD OF MANUFACTURING THE SAME

CROSS REFERENCE TO RELATED APPLICATIONS

The present application is based on and claims priority to Japanese Patent Applications No. 2010-177745 filed on Aug. 6, 2010, and No. 2011-46542 filed on Mar. 3, 2011, the contents of which are incorporated in their entirety herein by reference.

BACKGROUND OF THE INVENTION

1. Field of the Invention

The present invention relates an occupant detection sensor for detecting whether an occupant sits on a seat. The present invention also relates to a method of manufacturing an occupant detection sensor.

2. Description of the Related Art

JP-A-2005-233845 discloses a film sensor disposed in a narrow space between two rows of hanging grooves. In the film sensor, a sensor side end is located on a virtual substantially linear band that connects outside of a pair of sensor cells located closest to the sensor side end so as to secure occupant detection accuracy.

The narrow space in which the film sensor is disposed is located at a portion corresponding to a buttock of an occupant. Thus, the film sensor can detect sitting at a buttock but cannot detect sitting at a thigh. For example, even when a child stands in the vicinity of a backrest of a vehicle seat, the film sensor may be subjected to a load and may detect sitting of an occupant by error.

In some cases, the number of hanging grooves provided on a surface (upper side) of a cushion pad in a vehicle seat is increased to improve design or comfortableness. If the above-described film sensor is applied to such a seat without changing a shape, a coupling section (that is, a portion between sensors or a portion between a sensor and a connector) may straddle the hanging groove. A seat cover that covers the cushion pad includes a portion (trench portion) put in the hanging groove. When the seat cover is attached, the trench portion pushes the coupling section into the hanging groove. Then, the coupling section located at an edge of the hanging groove is bent and stress is generated. The stress influences the sensors through the film.

The sensor subjected to the stress is curved in accordance with the stress, and a distance between carbon layers increases. In other words, because the film sensor cannot detect sitting of an occupant unless the film sensor is subjected to a load greater than a sensor that is not subjected to a stress, accuracy (sensitivity) is reduced. Furthermore, because the sensor is continuously pressed down by the seat cover, the sensor may be damaged (for example, peeling off of the film or a silver layer) when a stress generated by bending exceeds a tolerance.

SUMMARY OF THE INVENTION

In view of the foregoing problems, it is an object of the present invention to provide an occupant detection sensor that can maintain an accuracy of a sensor member and can restrict damage of the senor member. Another object of the present invention is to provide a method of manufacturing an occupant detection sensor that can absorb stress generated by bending of a portion of a coupling section.

An occupant detection sensor according to an aspect of the present invention includes a sensor member disposed on a surface of a vehicle seat and detecting sitting of an occupant, a wiring member electrically coupling the sensor member with an external device, and a covering member covering the sensor member and the wiring member. The wiring member and the covering member are included in a coupling section that is disposed along the surface of the vehicle seat. The coupling section includes a bent portion and a stress absorbing portion that absorbs stress generated at the bent portion.

In the occupant detection sensor, even when stress is generated at the bent portion, the stress absorbing portion absorbs the stress. Thus, the occupant detection sensor can maintain an accuracy of the sensor member and can restrict damage of the sensor member.

In a method of manufacturing an occupant detection sensor according to another aspect of the present invention, a sensor member that detects sitting of an occupant is formed, a connector electrically coupling the sensor member with an external device is formed, and the sensor member and the connector are wired with a wiring member. The sensor member and the wiring member are covered with a covering member, and a stress absorbing portion is formed in a whole or a portion of a coupling section that includes the wiring member and the covering member located between the sensor member and the connector. The stress absorbing portion is formed to absorb stress generated by bending of a portion of the coupling section.

By the above-described method, an occupant detection sensor that can absorb stress generated by bending of a portion of the coupling section can be manufactured.

BRIEF DESCRIPTION OF THE DRAWINGS

Additional objects and advantages of the present invention will be more readily apparent from the following detailed description of exemplary embodiments when taken together with the accompanying drawings. In the drawings.

Figure 1A:
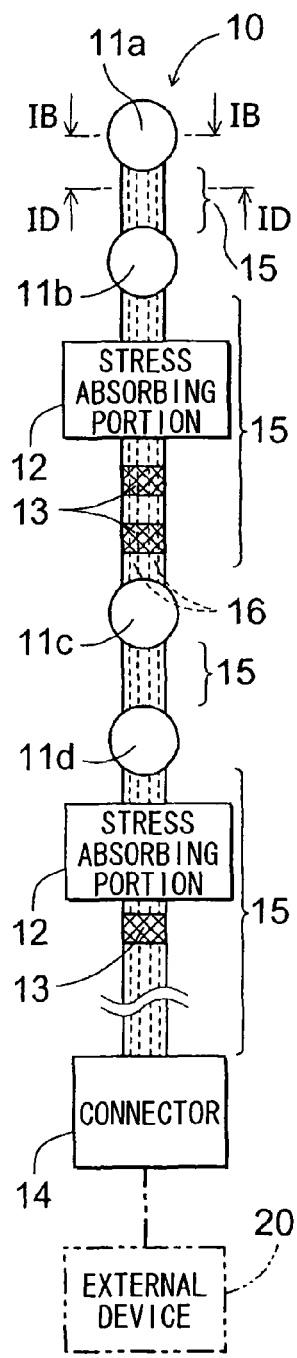
FIG. 1A is a plan view showing an occupant detection sensor.

DETAILED DESCRIPTION OF THE PREFERRED EMBODIMENTS (First Embodiment)

An occupant detection sensor 10 according to a first embodiment will be described with reference to FIG. 1A to FIG. 4D. The occupant detection sensor 10 includes a stress absorbing portion formed into a wavy shape.

The occupant detection sensor 10 includes one or more sensor members 11, one or more stress absorbing portions 12, one or more bent portions 13, a connector 14, one or more coupling sections 15, and one or more wiring members 16. The number of above-described components except for the connector 14 can be determined depending on a shape of a vehicle seat or a detecting position. In the present embodiment, one or more sensor members 11 and one or more bent portions 13 are located on the same line.

The sensor member 11 is also called "a sensor cell" or "a cell." The sensor member 11 detects an on (conductive) or off (nonconductive) state based on whether the sensor member 11 is subjected to a load by an occupant. The sensor member 11 has an upper surface (first surface) and a lower surface (second surface) opposed to each other. In the example shown in FIG. 1A, the one or more sensor members 11 include four sensor members 11a, 11b. 11c, 11d linearly arranged. In the following description, "the sensor member 11" means each of the sensor members 11a, 11b, 11c, 11d. In the example shown in FIG. 1A, the sensor member 11 has a circular planar shape. However, the sensor member 11 may have any planar shape including a polygonal planar shape.

Figure 1B:
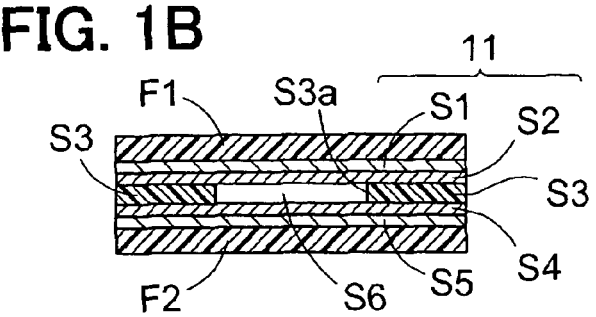
FIG. 1B is a cross-sectional view showing the occupant detection sensor taken along line IB-IB in FIG. 1A.

The sensor member 11 shown in FIG. 1B includes silver layers S1, S5, carbon layers S2, S4, a spacer layer S3, and a space layer S6. The above-described layers can be formed by stacking plate-shaped members. A surface of the sensor member 11 is covered with covering members F1, F2. The covering members F1, F2 may be made of any material and may have any shapes as long as the covering members F1, F2 can cover the sensor member 11 and the wiring member 16. For example, the covering member F1, F2 may have film shapes or plate shapes. In the example shown in FIG. 1B, an upper surface of the sensor member 11 (specifically, the silver layer S1) is covered with the covering member F1, and a lower surface of the sensor member 11 (specifically, the silver layer S5) is covered with the covering member F2. The covering member F1 can serve as a first film member, and the covering member F2 can serve as a second film member. The covering member F1, F2 may be made of any insulating resin. As mentioned below, the covering member F1 disposed on the upper surface of the sensor member F1 may also be made of soft resin such as polyvinyl chloride (PVC) resin having a lower rigidity than the other components.

The silver layers S1, S5 and the carbon layers S2, S4 form a pair of electrodes. For example, a first electrode can be formed by joining the silver layer S1 and the carbon layer S2 by welding or soldering, and a second electrode can be formed by joining the silver layer S5 and the carbon layer S4. The silver layers S1, S5 are metal plates including silver. The carbon layers S2, S4 are conductive plates including carbon.

The spacer layer S3 can serve as an intermediate film member. The spacer layer S3 is made of insulating hard resin such as polyethylene terephthalate (PET) resin. In the sensor member 11, the spacer layer S3 is disposed between the pair of electrodes, that is, the first electrode and the second electrode. The spacer layer S3 has a through hole S3a. The space layer S6 is a space defined by the covering member F1, the covering member F2, and the through hole S3a.

The space layer S6 is a region where the pair of electrodes can come in contact with each other. Air flows to the space layer S6 through a through hole (not shown). One or both of the electrodes are bent when the sensor member 11 is subjected to a load from outside. When the sensor member 11 is subjected to a load greater than a predetermined value, the electrodes come into contact with each other. In this way, contact and noncontact of the electrodes depends on whether the sensor member 11 is subjected to a load grater than a predetermined value because of sitting of an occupant, the sensor member 11 can detect an on-off state. Although it is not shown, the silver layer S1 and the carbon layer S2 (the first electrode) and the silver layer S5 and the carbon layer S4 (the second electrode) are separately coupled with the wiring members 16.

The stress absorbing portion 12 absorbs stress generated at the one or more bent portions 13. Details of the stress absorbing portion 12 will be described later (see FIG. 4). The stress means tensile force that is generated in the covering member (in particular, the covering member F1 being in contact with a seat cover 32) when the sensor member 11 is pressed by the seat cover 32. In a case where the stress absorbing portion 12 cannot absorb the stress, a member covered with the covering member (in particular, an end portion) is curved upward (deforms).

Figure 1C:
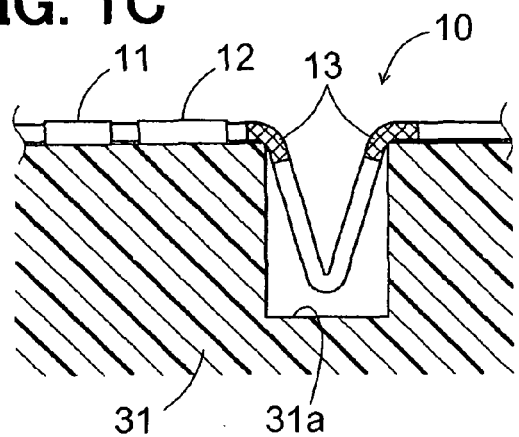
FIG. 1C is a diagram showing an exemplary state where the occupant detection sensor is attached to a vehicle seat.

The one or more bent portions 13 can serve as one or both of a first bent portion and a second bent portion. The bent portion 13 serving as the first bent portion is a portion which is bent with putting a portion of the occupant detection sensor 10 (in particular, the coupling section 15) in a hanging groove 31a of a cushion pad 31 in a case where the occupant detection sensor 10 is disposed along the hanging groove 31a as shown in FIG. 1C. In the example shown in FIG. 1C, two bent portions 13 are provided.

The bent portion 13 serving as the second bent portion is a portion bent along a surface (upper surface) of a cushion pad 31 and a through hole 31b of the cushion pad 31 in a case where the occupant detection sensor 10 is disposed along the through hole 31b of the cushion pad 31. Because of bending, stress is generated in the surface of the occupant detection sensor 10 (in particular, the covering member F1 on the outer side).

Figure 1D:
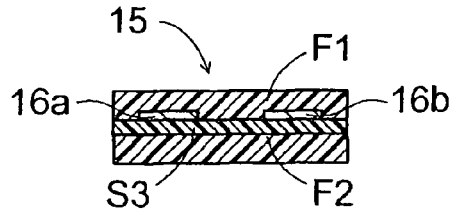
FIG. 1D is a cross-sectional view showing the occupant detection sensor taken along line ID-ID in FIG. 1A.
Figure 1E:
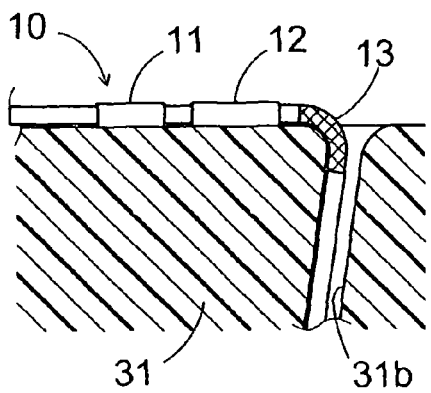
FIG. 1E is a diagram showing another exemplary state where the occupant detection sensor is attached to a vehicle seat.

Some of the sensor members 11 (for example, the sensor members 11c, 11d) is disposed between the bent portion 13 (the first bent portion) shown in FIG. 1C and the bent portion 13 (the second bent portion) shown in FIG. 1E. In the present case, the sensor members 11 have a large difference in bending inside and outside by being subjected to stress generated at both the bent portions 13. When the difference exceeds a tolerance, the sensor members 11 may be damaged by shear stress. The damage includes, for example, peeling off, rupturing, and cracking that occurs in at least one of the covering members F1, F2, the silver layer S1, S5, and the spacer layer S3. However, because the stress (including shear stress) generated by bending can be absorbed by the stress absorbing portion 12, the sensor members 11 are less likely to be damaged.

The connector 14 is electrically coupled with an external device 20 so as to transmit the presence or absence of the detection by the sensor members 11 to the external device 20. The external device 20 may be any device that can process the presence or absence of the detection by the sensor members 11. For example, the external device 20 may be an electronic control unit (ECU) or a computer such as a personal computer.

The coupling section 15 couples the sensor member 11 and another sensor member 11 or the sensor member 11 and the connector 14. An example of a configuration of the coupling section 15 is shown in FIG. 1D. The wiring members 16 and the spacer layer S2 are disposed between the covering members F1, F2 so as to be covered with the covering members F1, F2. In the example shown in FIG. 1D, the wiring members 16 include two wiring members 16a, 16b (for example, a positive side wiring and a negative side wiring). Depending on a configuration of a switch circuit, more than two wiring members may also appear a cross section. The wiring member 16 is made of a conductive body such as a copper plate or a copper wire. The wiring member 16 may have any shape as long as the wiring member 16 can provide wiring.

Figure 2A:
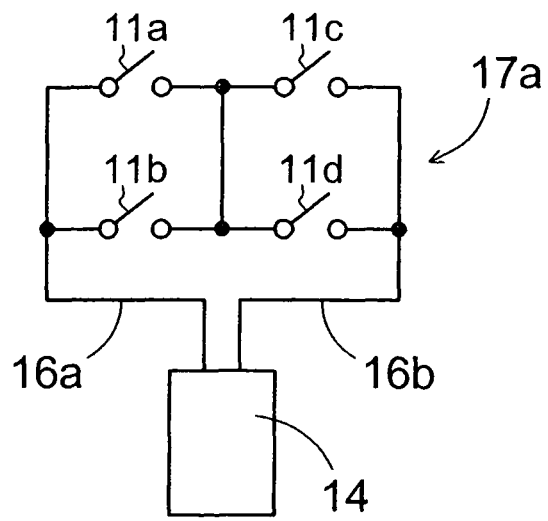
FIG. 2A is a diagram showing an example of a switch circuit.
Figure 2B:
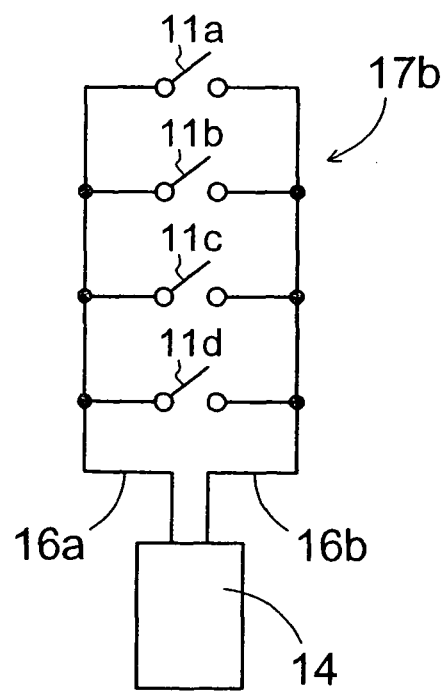
FIG. 2B is a diagram showing another example of a switch circuit.

The sensor members 11 (11a, 11b, 11c, 11d) and the wiring members 16 may have various connection form to configurate various switch circuits. Examples of the switch circuits are shown in FIG. 2A and FIG. 2B. In an exemplary switch circuit 17a shown in FIG. 2A, the sensor members 11a, 11b are coupled in parallel, and the sensor members 11c, 11d are coupled in parallel. In addition, the sensor members 11a, 11b and the sensor members 11c, 11d are coupled in series. The wiring member 16a couples the sensor members 11a, 11b and the connector 14, and the wiring member 16b couples the sensor members 11c, 11d and the connector 14. In a case where the switch circuit 17a is used, when one of the sensor members 11a, 11b and one of the sensor members 11c, 11d turn on, the occupant detection sensor 10 detects an on-state as a whole.

In another exemplary switch circuit 17b shown in FIG. 2B, all the sensor members 11a, 11b, 11c, 11d are coupled in parallel. The wiring member 16a couples an end of each sensor member and the connector 14, and the wiring member 16b couples the other end of each sensor member and the connector 14. In a case where the switching 17b is used, when one of the sensor members 11a, 11b, 11c, 11d turns on, the occupant detection sensor 10 detects an on-state as a whole. In this way, an on-off state detected as a whole depends on a configuration of a switch circuit. Thus, a configuration of a switch circuit is determined based on a detection object and a type of seat such as a driver seat, a passenger seat, and a back seat and is not limited to the above-described switch circuit 17a, 17b.

Figure 3A:
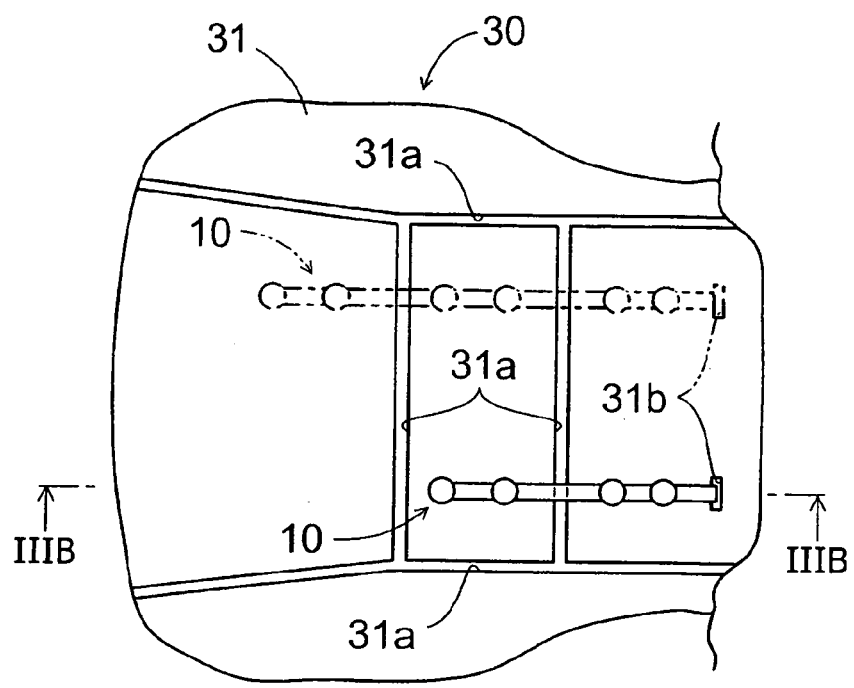
FIG. 3A is a plan view showing an exemplary installation of the occupant detection sensors to a vehicle seat.
Figure 3B:
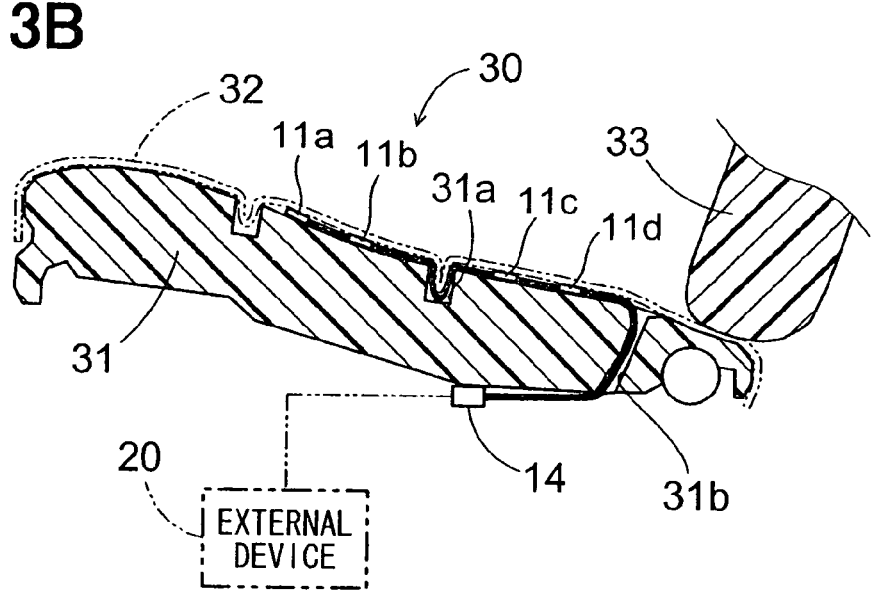
FIG. 3B is a cross-sectional view showing an exemplary installation of the occupant detection sensor to a vehicle seat.

An example of a state where the occupant detection sensor 10 is disposed to a vehicle seat is shown in FIG. 3A and FIG. 3B. A vehicle seat 30 shown in FIG. 3A and FIG. 3B includes cushion pads 31, 33 shown by solid lines, and a seat cover 32 shown by dashed-two dotted line. The cushion pad 31 is used as a seat portion to which a buttock and a thigh of an occupant sit. The cushion pad 33 is used as a backrest to which a back of an occupant sots. The cushion pads 31, 33 are covered with the seat cover 32 to improve appearance. However, the seat cover 32 covering the cushion pad 33 is not shown in FIG. 3B.

The cushion pad 31 includes one or more hanging grooves 31a or one or more through holes 31b. The hanging grooves 31a are grooves provided on an upper surface (i.e., a surface on which an occupant sits) of the cushion pad 31 and has a predetermined width and a predetermined depth. In the example shown in FIG. 3A, the hanging grooves 31a are provided in straight lines. However, the having groove 31a may also be provided in curved lines and may also be a combination of straight line and curved lines. The through holes 31b are holes that penetrate the cushion pad 31 from the upper surface to the lower surface. In general, the through holes 31b are provided adjacent to the cushion pad 33.

In the vehicle seat 30, one or more occupant detection sensors 10 are disposed along the upper surface of the cushion pad 31 and the connectors 14 are fixed by fixing members through the through holes 31b. The fixing member includes a conclusion member, such as a bolt and a screw, and adhesive. A portion of the occupant detection sensor 10 is bent along a cross-sectional shape (depressed shape) of the hanging groove 31a as shown in FIG. 3B. Because the seat cover 32 is attached so as to cover the upper surface of the occupant detection sensor 10, the bent state of the occupant detection sensor 10 is continuously maintained. Thus, the coupling sections 15 located at the corner portions of the hanging groove 31a are bent, the sensor members 11 are pressed by the seat cover 32, and thereby causing stress. The stress is applied to the sensor members 11 through the covering members (in particular, the covering member F1 on the upper surface side). The stress absorbing portions 12 will be described with reference to FIG. 4A to FIG. 4D.

Figure 4A:
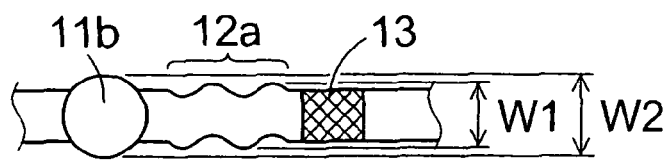
FIG. 4A is a plane view showing a coupling section including an exemplary wavy portion according to a first embodiment.
Figure 4B:
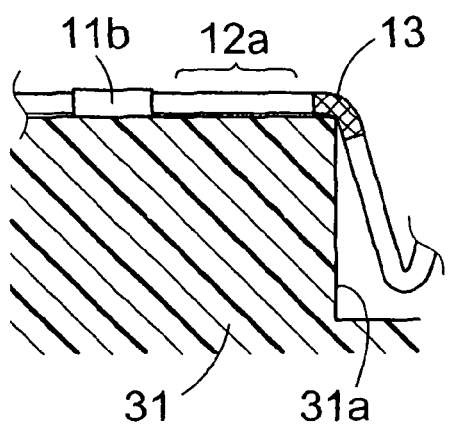
FIG. 4B is a side view showing the coupling section including the exemplary wavy portion.

The stress absorbing portion 12 includes a wavy portion 12a shown in FIG. 4A and FIG. 4B. The wavy portion 12a is provided between the sensor member 11 and the bent portion 13 (or the hanging groove 31a) by forming a portion of the coupling section 15 into a wavy shape. In other words, a portion of the coupling section 15 has a wavy shape when viewed in a plane as shown in FIG. 4A, and the portion of the coupling section 15 has a plate shape when viewed on a side as shown in FIG. 4B. A maximum width W1 of the wavy portion 12a may be less than or equal to a diameter W2 of the sensor member 11b, that is, W1≤W2.

In a relationship between the covering members F1, F2 and the wiring members 16 (16a, 16b), the wavy portion 12a can be formed by two ways. In a first way, a cross-sectional configuration shown in FIG. 1D is maintained, and all of the covering members F1, F2 and the wiring members 16 are bent into wavy shapes. In a second way, the covering members F1, F2 are bent into wavy shapes, and one or more wiring members 16 are formed into linear shapes.

Figure 4C:
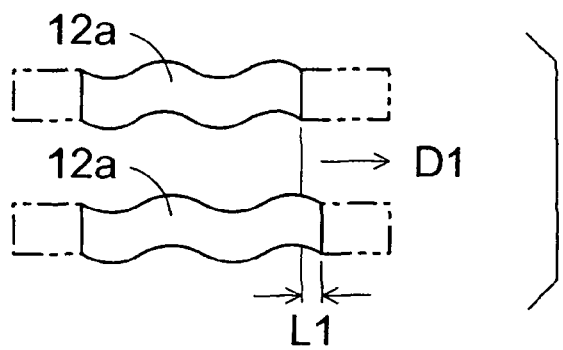
FIG. 4C is a diagram showing a change in the wavy portion in accordance with stress generated at a bent portion.

A change in the wavy portion 12a in accordance with the stress generated by bending of the bent portion 13 will be described with reference to FIG. 4C. A state of the wavy portion 12a before generation of the stress is shown in an upper diagram in FIG. 4C and a state of the wavy portion 12a after generation of the stress is shown in a lower diagram in FIG. 4O. The stress generated at the bent portion 13 is a tensile force that pulls the coupling section 15 (specifically, the covering member F1) in a direction shown by the arrow D1 (a direction from left to right). Thus, the wavy portion 12a extends by a length L1 to absorb the stress.

Figure 4D:
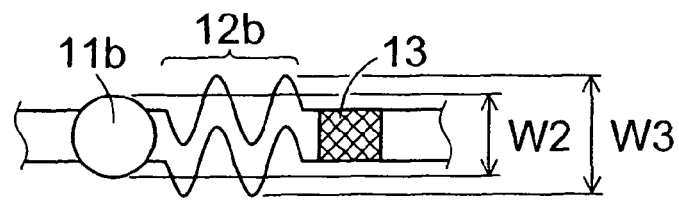
FIG. 4D is a diagram showing a coupling section including another exemplary wavy portion according to the first embodiment.

In the example shown in FIG. 4A, the maximum width W1 of the wavy portion 12a is less than or equal to the diameter W2 of the sensor member 11b. In a case where the width of wavy portion gives no problems, as shown in FIG. 4D, the stress absorbing portion 12 may include a wavy portion 12b having a maximum width W3 that is greater than the diameter W2 of the sensor member 11b. Because the wavy portion 12b can have a longer extension length L1 than the wavy portion 12a, the wavy portion 12b can absorb more stress.

Next, a manufacturing method of the occupant detection sensor 10 will be described.

Firstly, the sensor member 11 is formed. For example, the first electrode is formed by joining the silver layer S1 and the carbon layer S2 and the second electrode is formed by joining the silver layer S5 and the carbon layer S4. The spacer layer S3 is disposed between the first electrode and the second electrode and is bonded to the carbon layers S2, S3. When the covering members F1, F2 have film shapes, a silver layer and a carbon layer may be fixed to each single surface of the covering members F1, F2, for example, by printing, depositing, or bonding. Then, the connector 14 is formed by a known process.

The sensor member 11 (specifically, the above-described first electrode and the second electrode) is coupled with the connector 14 through the wiring members 16 (16a, 16b), for example, by bonding, welding, or soldering. In a case where the covering members F1, F2 are film members, the first electrode, the second electrode, and the wiring members 16 (16a, 16b) are integrated and are fixed to each single surface, for example, by printing, depositing, or bonding.

The covering members F1, F2 are previously formed so that the wavy portions 12a are formed at portions of the coupling sections 15 located between the sensor members 11b and the bent portions 13. Then, the sensor member 11 and the wiring members 16 are covered with the covering members F1, F2 so that the cross-section becomes a state as shown in FIG. 1B or FIG. 1D. In a case where the covering members F1, F2 are film members, the surfaces on which the silver layers and the carbon layers are fixed are opposed to each other, and the covering member F1 and the covering member F2 may be bonded from either side of the spacer layer S3.

As described above, the occupant detection sensor according to the present embodiment includes the sensor member 11, the connector 14, the wiring member 16, and the covering members F1, F2. The coupling section 15 is disposed along the surface of the vehicle seat 30. The coupling section 15 includes the stress absorbing portion 12, that is, the wavy portion 12a, 12b that absorbs stress generated at the bent portion (first bent portion) 13 located at the corner of the hanging groove 31a as shown in FIG. 4A and FIG. 4B. Accordingly, even when the coupling section 15 is bent and stress is generated, the wavy portion 12a, 12b absorbs the stress. Thus, the stress generated by bending does not influence the sensor member 11. Thus, the sensor member 11 can have a high accuracy (sensitivity) and the sensor member 11 is less likely to be damaged. The wavy portion 12a, 12b may be located adjacent to the bent portion 13 so as to reduce influence by the stress to other members such as the sensor members 11b, 11c, 11d and the connector 14.

The wavy portion 12a, 12b may be formed by bending a portion of the coupling section 15 into a wavy shape that curves in one direction (for example, the width direction) as shown in FIG. 4A and FIG. 4B. The stress generated by bending can be absorbed by extension of the wavy portion 12a, 12b. Because the stress absorbing portion 12 has a simple configuration, a manufacturing cost can be restricted.

The wavy portion 12a may have the maximum width W1 that is less than or equal to the diameter (maximum width) W2 of the sensor member 11 as shown in FIG. 4A. In the present case, the whole width of the occupant detection sensor 10 can be restricted to be less than or equal to a predetermined value (W2). Thus, manufacturing of the occupant detection sensor 10 can be easy, and arrangement of components can be easy.

The sensor members 11a, 11b, 11c, 11d may be linearly arranged as shown in FIG. 1A. In the present case, the whole width of the occupant detection sensor 10 may be small and the occupant detection sensor 10 can be manufactured easily. Thus, the manufacturing cost can be restricted. In addition, the occupant detection sensor 10 can detect detected not only sitting at a buttock but also sitting at a thigh, and the accuracy of detecting occupant can be improved.

The coupling section 15 may be disposed along the hanging groove 31a formed on an upper surface side of the vehicle seat 30. In the present case, even when stress is generated by bending the coupling section 15 along an uneven shape of the hanging groove 31a, the stress absorbing portion 12 absorbs the stress. Thus, the accuracy (sensitivity) of the sensor member 11 is maintained, and damage of the sensor member 11 is restricted.

The sensor member 11 is subject to a load due to sitting of an occupant and detects the sitting of the occupant. In the present case, even when the coupling section 15 is bent by being subjected to a load due to sitting of an occupant, and thereby stress is generated, the stress absorbing portion 12 absorbs the stress. Thus, the accuracy (sensitivity) of the sensor member 11 is maintained, and damage of the sensor member 11 is restricted.

The method of manufacturing the occupant detection sensor 10 includes forming the sensor member 11, forming the connector 14, coupling the sensor member 11 and the connector 14 with the wiring member 16, covering the sensor member 11 and the wiring member 16 with the covering member F1, F2, and forming the wavy portion 12a. The above-described manufacturing method can provide the occupant detection sensor 10 in which the wavy portion 12a, 12b can absorb stress generated by bending the portion of the coupling section 15 located at the corner of the hanging groove 31a.

(Second Embodiment)

An occupant detection sensor according to a second embodiment will be described with reference to FIG. 5A to FIG. 5D.

Figure 5A:
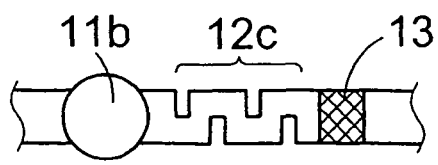
FIG. 5A is a plane view showing a coupling section including an exemplary slit-formed portion according to a second embodiment.
Figure 5B:
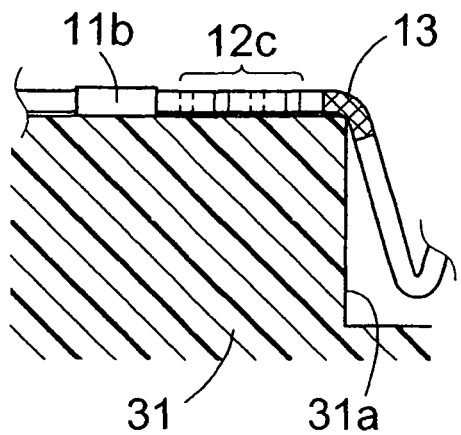
FIG. 5B is a side view showing the coupling section including the exemplary slit-formed portion.

The stress absorbing portion 12 may include a slit-formed portion 12c as shown in FIG. 5A and FIG. 5B. The slit-formed portion 12c may have any number of slits and any direction of slits. In the example shown in FIG. 5A, the slit-formed portion 12c includes rectangular slits alternately provided on opposite sides in a width direction of the coupling section 15. A length of each slit in the width may be greater than or equal to a half width of the coupling section 15.

Figure 5C:
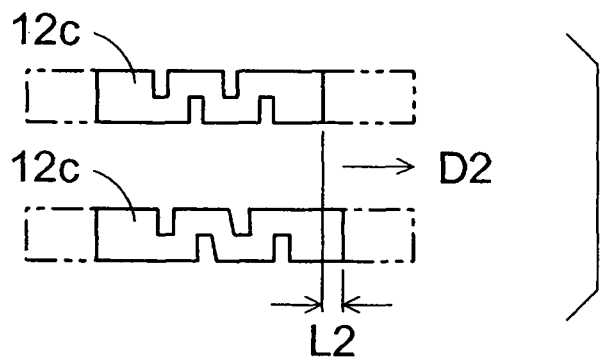
FIG. 5C is a diagram showing a change in the slit-formed portion in accordance with stress generated at a bent portion.

A change in the slit-formed portion 12c in accordance with the stress generated by bending of the bent portion 13 will be described with reference to FIG. 5C. A state of the slit-formed portion 12c before generation of the stress is shown in an upper diagram in FIG. 5C and a state of the slit-formed portion 12c after generation of the stress is shown in a lower diagram in FIG. 5C. The stress generated at the bent portion 13 is a tensile force that pulls the coupling section 15 (specifically, the covering member F1) in a direction shown by the arrow D2 (a direction from left to right). Thus, the slit-formed portion 12c extends by a length L3 to absorb the stress. When the slit-formed portion 12c is pulled, the slit-formed portion 12c may be curved upward. However, the seat cover 32 presses the slit-formed portion 12c downward.

Figure 5D:
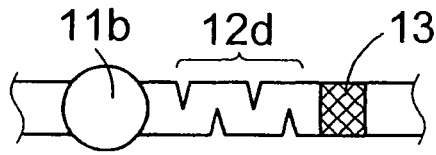
FIG. 5D is a diagram showing a coupling section including another exemplary slit-formed portion according to the second embodiment.

In the example shown in FIG. 5A, the slit-formed portion 12c includes the rectangular slits. The stress absorbing portion 12 may include a slit-formed portion having any slit shape. For example, as shown in FIG. 5D, the stress absorbing portion 12 may also include a slit-formed portion 12d having triangular slits. The stress absorbing portion 12 may also have semicircle slits or polygonal slits greater than or equal to hexagonal shape. Even when the stress absorbing portion 12 has any shape slits, the stress can be absorbed by extension of the stress absorbing portion 12.

Next, a method of manufacturing the occupant detection sensor will be described. In the present embodiment, a process of forming the sensor member 11, a process of forming the connector 14, and a process of wiring are similar to those processes described in the first embodiment. A process of covering is different from the process of covering described in the first embodiment.

The process of covering can be performed by the following two ways. In a first way, the slit-formed portion 12c, 12d is previously formed in the covering members F1, F2 located at the portion of the coupling section 15 between the sensor member 11 and the bent portion 13. Then, the e sensor member 11 and the wiring member 16, which are coupled in the wiring process, are covered with the covering members F1, F2 as shown in FIG. 1B and FIG. 1D. In a second way, after covering the sensor member 11 and the wiring member 16, which are coupled in the wiring process, with the covering members F1, F2, the slit-formed portions 12c, 12d are formed at the portions of the coupling section 15 between the sensor member 11b and the bent portion 13.

As described above, the occupant detection sensor 10 according to the present invention includes the slit-formed portion 12c, 12d (the stress absorbing portion 12) at the portion of the coupling section 15. Accordingly, stress generated by bending can be absorbed by the slit-formed portion 12c, 12d having a plurality of slits. Because the stress absorbing portion 12 has a simple configuration, a manufacturing cost can be restricted.

The method of manufacturing the occupant detection sensor 10 includes forming the sensor member 11, forming the connector 14, wiring the sensor member 11 and the connector 14 through the wiring member 16, covering the sensor member 11 and the wiring member 16 with the covering members F1, F2 and forming the slit-formed portion 12c, 12d. The above-described manufacturing method can provide the occupant detection sensor 10 in which the slit-formed portion 12c, 12d can absorb stress generated by bending of the portion of the coupling section 15 located at the corner of the hanging groove 31a.

Because the other points are similar to the occupant detection sensor 10 according to the first embodiment, effects similar to the effects of the first embodiment can be achieved.

(Third Embodiment)

An occupant detection sensor 10 according to a third embodiment will be described with reference to FIG. 6A to FIG. 6D.

Figure 6A:
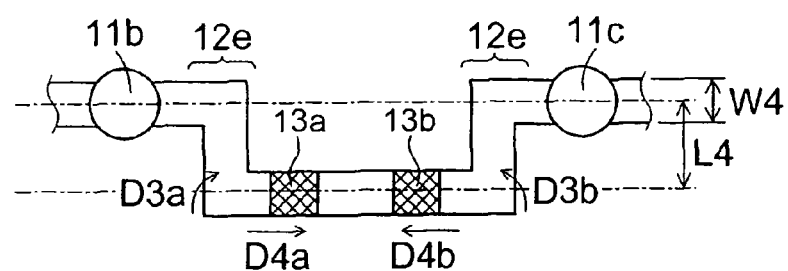
FIG. 6A is a plane view showing a coupling section including an exemplary non-linear portion according to a third embodiment.
Figure 6B:
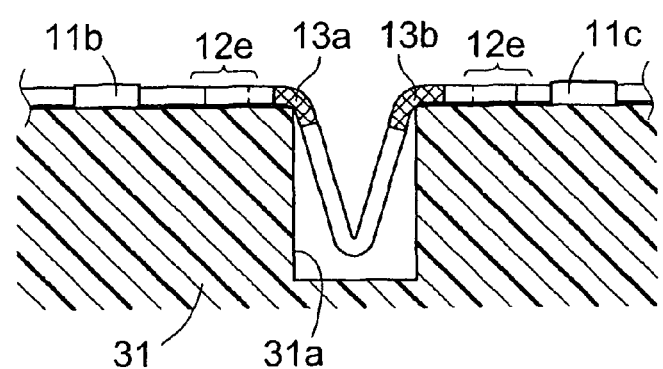
FIG. 6B is a side view showing the coupling section including the exemplary non-linear portion.

As shown in FIG. 6A and FIG. 6B, in the occupant detection sensor 10 according to the present embodiment, the sensor members 11a, 11b, 11c, 11d are not disposed on the same line with the bent portions 13, and the stress absorbing portion 12 includes a non-linear portion 12e. The non-linear portion 12e is formed by processing a portion of the coupling portion 15 nonlinearly.

In the example shown in FIG. 6A, the non-linear portion 12e is formed into a crank shape. Stress generated by bending of the bent portion 13a is a tensile force that pulls the coupling section 15 (specifically, the covering member F1) in a direction shown by the arrow D4a (a direction from left to right). Stress generated due to bending of the bent portion 13b is a tensile force that pulls the coupling section 15 in a direction shown by the arrow D4b (a direction from right to left). Thus, L-shaped portions in the non-linear portion 12e adjacent to the bent portions 13a, 13b are curved upward as shown by the arrows D3a, D3b to absorb the stress generated at the bent portions 13a, 13b. Actually, the L-shaped portions are pressed downward by the seat cover 32 shown in FIG. 3B. Thus, the L-shaped portions and portion of the coupling section 15 in the vicinity of the L-shaped portion deform into a wavy shape in a thickness direction, and thereby absorbing the stress. A distance L4 between a center line of the occupant detection sensor 10 and a center line drawn through the bent portions 13a, 13b may be greater than or equal to a width W4 of the coupling section, that is, L4≧W4. Each center line is shown by a dashed-dotted line.

Figure 6C:
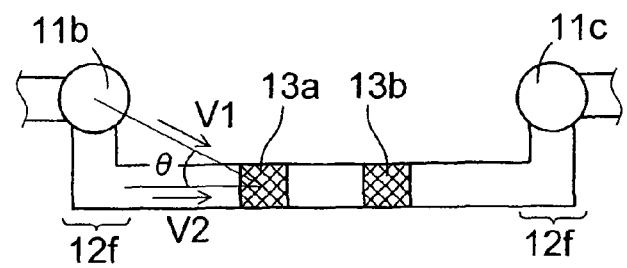
FIG. 6C is a plan view showing a coupling section including another exemplary non-linear portion according to the third embodiment.
Figure 6D:
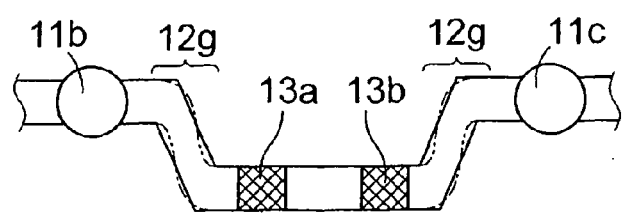
FIG. 6D is a plan view showing a coupling section including another exemplary non-linear portion according to the third embodiment.

A shape of a non-linear portion formed at a portion of the coupling section 15 is not limited to the crank shape shown in FIG. 6A. The stress absorbing portion 12 may also include a non-linear portion 12f having an L-shape as shown in FIG. 6C, the stress absorbing portion 12 may also include a non-linear portion 12g having a bent portion as shown in FIG. 6D, and the stress absorbing portion 12 may also include a non-linear portion 12g having a curved shape (S-shape) as shown by dashed-two-dotted line in FIG. 6D. The sensor member 11b and the bent portion 13 are disposed so as to satisfy the following predetermined condition. The predetermined condition is shown in FIG. 6C on behalf of FIG. 6A, FIG. 6C, and FIG. 6D. A segment connecting the sensor member 11b and the bent portion (vector V1) intersects with a segment (vector V2) that shows a generation direction of stress. In other words, the segments intersect with each other at an angle θ (360 degrees>θ>0 degree).

The occupant detection sensor 10 according to the present invention includes the sensor member 11, the connector 14, the wiring member 16, and the covering members F1, F2. The coupling section 15 is disposed along the surface of the vehicle seat 30. The coupling section 15 includes the stress absorbing portion 12, that is, the non-linear portion 12e, 12f, 12g that absorbs stress generated at the bent portion (first bent portion) 13 located at the corner of the hanging groove 31a as shown in FIG. 6A to FIG. 6B. Accordingly, even when the coupling section 15 is bent and stress is generated, the non-linear portion 12e, 12f, 12g absorbs the stress. Thus, the stress generated by bending does not influence the sensor member 11. Thus, the accuracy (sensitivity) of the sensor member 11 is maintained, and damage of the sensor member 11 is restricted. Furthermore, because the non-linear portion 12e, 12f, 12g is only formed into a non-linear shape, an occupant detection sensor 10 in which the coupling section 15 diverges into more than one sections such as a T-shape and a Y-shape and the sensor member 11 is disposed at the diverged portion can be formed. Because a manufacturing method of the occupant detection sensor 10 according to the present embodiment is similar to the manufacturing method of the occupant detection sensor according to the first embodiment, effects similar to the effects described in the first embodiment can be achieved.

(Fourth Embodiment)

An occupant detection sensor 10 according to a fourth embodiment will be described with reference to FIG. 7A to FIG. 7C.

The stress absorbing portion 12 may include a wavy portion 12h. The wavy portion 12h shown in FIG. 7A and FIG. 7B is different from the wavy portion 12a shown in FIG. 4A and FIG. 4B in a shape of wave and a position where the wave is formed. The wavy portion 12h is formed by processing a portion of the coupling section 15 into a wavy shape in a thickness direction of the coupling section 15. The wavy portion 12h may also be formed at a portion of the coupling section 15 similar to the wavy portion 12a. However, when the wavy portion 12h is formed at the portion of the coupling section 15 similar to the wavy portion 12a, comfortableness of an occupant may deteriorate because the wavy shape is formed in the thickness direction. Thus, in the present embodiment, the wavy portion 12h is formed at a portion put into the hanging groove 31a (between the bent portions 13) so as not to influence a comfortableness of an occupant.

A change in the wavy portion 12h in accordance with the stress generated by the bending of the bent portion 13 will be described with reference to FIG. 7C. A state of the wavy portion 12h before generation of the stress is shown in an upper diagram in FIG. 7C and a state of the wavy portion 12h after generation of the stress is shown in a lower diagram in FIG. 7C. To simplify, FIG. 7C shows side views unlike FIG. 4C which shows plan views. The stress generated at the bent portion 13 is a tensile force that pulls the coupling section 15 (specifically, the covering member F1) in a direction shown by the arrow D5 (a direction from right to left). Thus, the wavy portion 12h extends by a length L3, that is, approaches a plane to absorb the stress.

A manufacturing method of the occupant detection sensor 10 will be described. In the present embodiment, a process of forming the sensor member 11, a process of forming the connector 14, and a process of wiring are similar to those processes described in the first embodiment. A process of covering is different from the process of covering described in the first embodiment.

The process of covering can be performed by the following two ways. In a first way, the wavy portion 12h is previously formed in the covering members F1, F2 located at the portion of the coupling section 15 between the bent portions 13. Also a corresponding portion of the wiring member 16 is formed into a wavy shape. Then, the member 11 and the wiring member 16, which are coupled in the wiring process, are covered with the covering members F1, F2 as shown in FIG. 1B and FIG. 1D. In a second way, after covering the sensor member 11 and the wiring member 16, which are coupled in the wiring process, with the covering members F1, F2, the portion of the coupling section 15 is formed into wavy shape, for example, with a pressing machine to form the wavy portion 12h.

As described above, the occupant detection sensor according to the present embodiment includes the sensor member 11, the connector 14, the wiring member 16, and the covering members F1, F2. The coupling section 15 is disposed along the surface of the vehicle seat 30. The coupling section 15 includes the stress absorbing portion 12, that is, the wavy portion 12h that absorbs stress generated at the bent portion (first bent portion) 13 located at the corner of the hanging groove 31a as shown in FIG. 7A and FIG. 7D. Accordingly, even when the coupling portion 15 is bent and stress is generated, the wavy portion 12h absorbs the stress. Thus, the stress generated by bending does not influence the sensor member 11. Thus, the accuracy (sensitivity) of the sensor member 11 is maintained, and damage of the sensor member 11 is restricted.

Figure 7A:
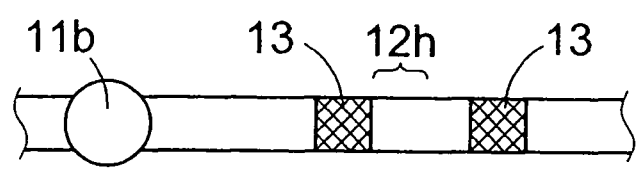
FIG. 7A is a plan view showing a coupling section including an exemplary wavy portion according to a fourth embodiment.
Figure 7B:
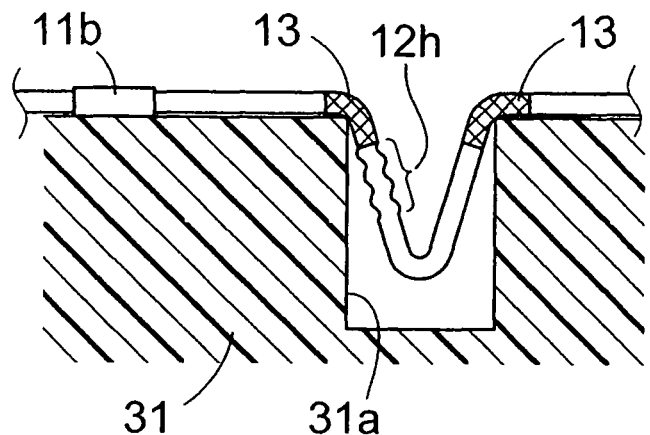
FIG. 7B is a side view showing the coupling section including the exemplary wavy portion.

The wavy portion 12h is formed by bending the portion of the coupling section 15 into the wavy shape in the thickness direction as shown in FIG. 7A and FIG. 7B. The stress generated by bending of the bent portion 13 can be absorbed by extension of the wavy portion 12h. Because the stress absorbing portion 12 has a simple configuration, a manufacturing cost can be restricted.

The method of manufacturing the occupant detection sensor 10 includes forming the sensor member 11, forming the connector 14, wiring the sensor member 11 and the connector 14 with the wiring member 16, covering the sensor member 11 and the wiring member 16 with the covering members F1, F2 and forming the wavy portion 12h. The above-described manufacturing method can provide the occupant detection sensor 10 in which the wavy portion 12h can absorb stress generated by bending the portion of the coupling portion 15 located at the corner of the hanging groove 31a.

(Fifth Embodiment)

An occupant detection sensor, according to a fifth embodiment will be described with reference to FIG. 8A and FIG. 8B.

Figure 8A:
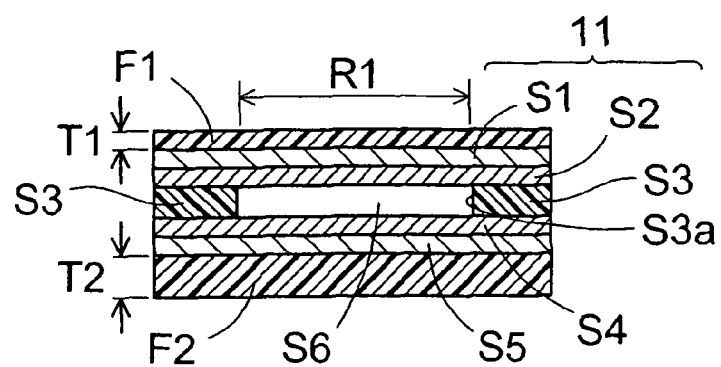
FIG. 8A is a cross-sectional view showing a sensor member according to a fifth embodiment.
Figure 8B:
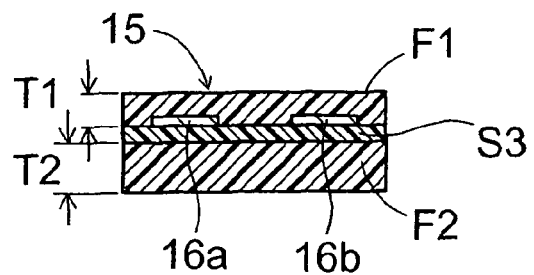
FIG. 8B is a cross-sectional view showing a coupling section according to the fifth embodiment.

In an example shown in FIG. 8A and FIG. 8B, the covering member F1 has a thickness T1, the covering member F2 has a thickness T2, and the thickness T1 is less than the thickness T2 while securing a predetermined insulation resistance. In the present embodiment, the covering member F1 having the thickness T1 can serve as the stress absorbing portion 12. When the thickness of the covering member F1 is reduced, the covering member F1 easily extends. Thus, stress generated by bending the bent portion 13 is absorbed by extension of the covering member F1 located on the upper surface side. When the coupling section 15 can have a predetermined strength (rigidity), the covering member F2 may have the thickness T1.

As described above, the occupant detection sensor 10 includes the covering member F1 (the first film member) that covers the first surface of the sensor member 11 and the covering member F2 (the second film member) that covers the second surface of the sensor member 11. The covering member F1 having the thickness T1 less than the thickness T2 of the covering member F2 can serve as the stress absorbing portion 12 (see FIG. 8A and FIG. 8B; T1<T2). Because the covering member F1 having a small thickness can easily extend, stress generated by bending can be absorbed by extension of the covering member F1. Because the stress absorbing portion 12 has a simple configuration, a manufacturing cost can be restricted.

The occupant detection sensor 10 according to the present embodiment can be manufactured in a manner similar to the occupant detection sensor 10 according to the first embodiment except that the process of forming the wavy shape is replaced by a process of forming the covering member F1 having the thickness T1.

(Sixth Embodiment)

An occupant detection sensor according to a sixth embodiment will be described with reference to FIG. 9A to FIG. 9D.

Figure 9A:
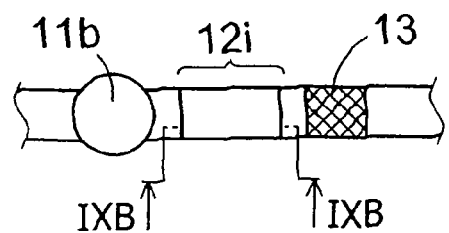
FIG. 9A is a plane view showing a coupling section including an exemplary elastic-body formed portion according to a sixth embodiment.
Figure 9B:
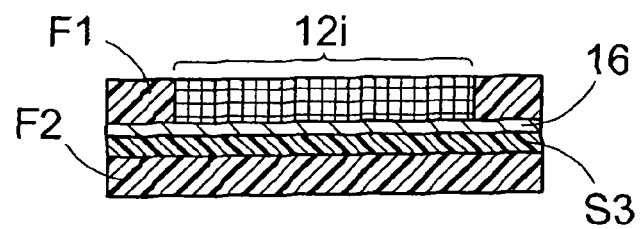
FIG. 9B is a cross-sectional view showing the coupling section taken along line IXB-IXB in FIG. 9A.

In an example shown in FIG. 9A, the covering member F1 includes an elastic-body formed portion 12i made of elastic body such as soft resin including polyvinyl chloride (PVC) resin and rubber. In the thickness direction of the covering member F1, the elastic-body formed portion 12i is disposed at the whole of the covering member F1 as shown in FIG. 9B. In an example shown in FIG. 9C, the covering member F1 includes an elastic-body formed portion 12j made of elastic body. In the thickness direction of the covering member F1, the elastic-body formed portion 12j is disposed at a portion of the covering member F1. In the above-describe configurations, the covering member F1 including the elastic-body formed portion 12i, 12j can serve as the stress absorbing portion 12. Because elastic body easily extends, stress generated by bending of the bent portion 13 can be absorbed by extension of the covering member F1.

Figure 9C:
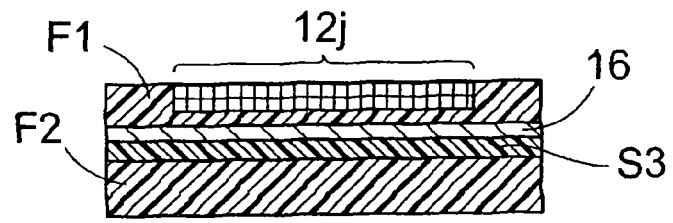
FIG. 9C is a cross-sectional view showing a coupling section including another exemplary elastic-body formed portion according to the sixth embodiment.
Figure 9D:
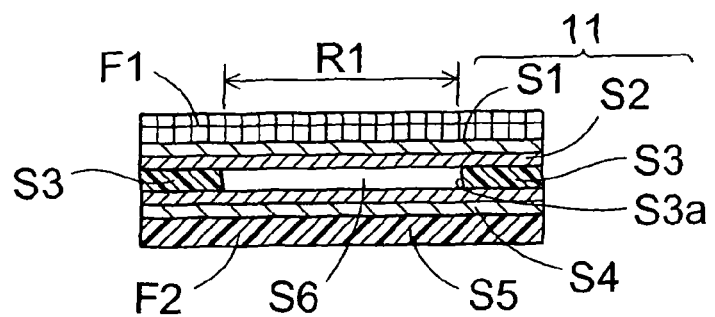
FIG. 9D is a cross-sectional view showing a coupling section including another exemplary elastic-body formed portion according to the sixth embodiment.

In the examples shown in FIG. 9A to FIG. 9C, only a portion of the covering member F1 located in the coupling section 15 is made of elastic body. The covering member F1 that covers the sensor member 11 may also be made of elastic body as shown in FIG. 9D, and both of the covering members F1, F2 may also be made of elastic body. In the configuration shown in FIG. 9D, the covering member F1 can serve as the stress absorbing portion 12. Also in this configuration, stress generated by bending of the bent portion 13 can be absorbed by extension of the covering member F1 located on the upper surface side.

As described above, the occupant detection sensor 10 according to the present embodiment includes the covering member F1 (the first film member) that covers the first surface of the sensor member 11 and the covering member F2 (the second film member) that covers the second surface of the sensor member 11. At least a portion of the covering member F1 is made of soft resin that has a lower rigidity than the other portion, and the covering member F1 serves as the stress absorbing portion 12. In this configuration, even when a covering member having the same thickness is used, because the stress absorbing portion 12 is made soft resin having a low rigidity, the stress absorbing portion 12 can absorb stress generated by bending. Because the stress absorbing portion 12 has a simple configuration, a manufacturing cost can be restricted.

The occupant detection sensor 10 according to the present embodiment can be manufactured in a manner similar to the occupant detection sensor 10 according to the first embodiment except that the process of forming the wavy shape is replaced by forming the covering member F1 having the thickness T1.

(Seventh Embodiment)

An occupant detection sensor 10 according to a seventh embodiment will be described with reference to FIG. 10A to FIG. 12D.

Figure 10A:
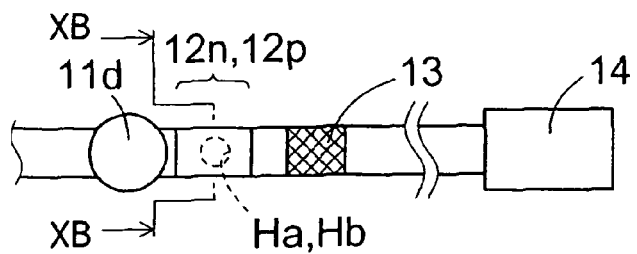
FIG. 10A is a plan view showing a coupling section including an exemplary hollow-part formed portion or an exemplary hole formed portion according to a seventh embodiment.

The bent portion 13 (the second bent portion) shown in FIG. 10A is located between the sensor member 11d and the connector 14 and is bent along the upper surface of the cushion pad 31 and the through hole 31b (see FIG. 1E). The stress absorbing portion 12 absorbs stress generated at the bent portion 13. In the present embodiment, the stress absorbing portion 12 includes a hollow-part formed portion 12n or a hole-formed portion 12p. The hollow-part formed portion 12n includes a hollow part Ha (Ha1-Ha4) as shown in FIG. 10B and FIG. 11A-FIG. 11D. The hole-formed portion 12p includes a hole Hb (Hb1-Hb4). Examples of the hollow part Ha and the hole Hb will be described below.

Figure 10B:
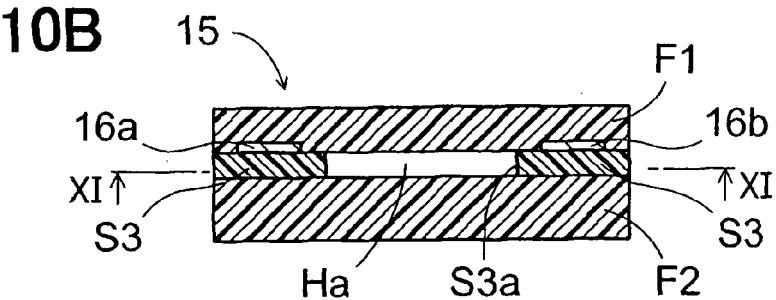
FIG. 10B is a cross-sectional view showing the coupling section including the exemplary hollow-part formed portion taken along line XB-XB in FIG. 10A.

The hollow-part formed portion 12n includes the hollow part Ha provided in the coupling section 15. As shown in FIG. 10B, the hollow part Ha is a space defined, that is, surrounded by the covering members F1, F2 and the through hole S3a. The through hole S3a is a hole provided in the spacer layer S3. The through hole S3a may have any planar shape such as a polygonal shape (greater than a triangle) and a circular shape including an ellipse and a crescent. Examples of the planar shape of the through hole S3a are shown in FIG. 11A to FIG. 11D.

Figure 11A:
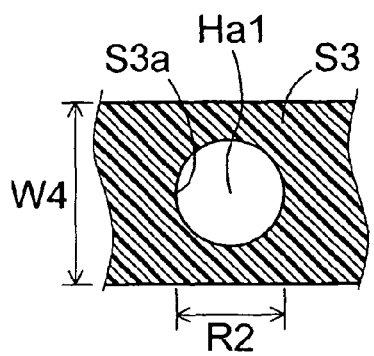
FIG. 11A is a cross-sectional view showing an exemplary hollow-part formed portion taken along line XI-XI in FIG. 10B.
Figure 11B:
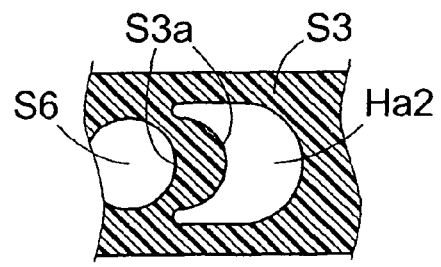
FIG. 11B is a cross-sectional view showing another exemplary hollow-part formed portion taken along line XI-XI in FIG. 10B.
Figure 11C:
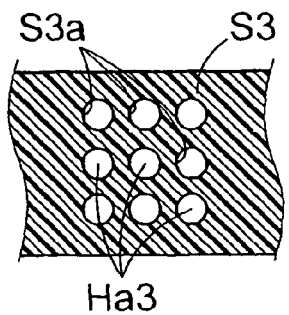
FIG. 11C is a cross-sectional view showing another exemplary hollow-part formed portion taken along line XI-XI in FIG. 10B.
Figure 11D:
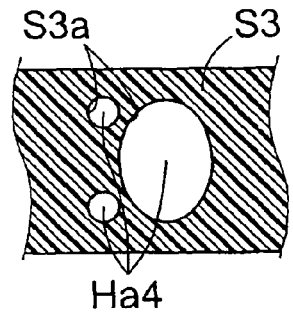
FIG. 11D is a cross-sectional view showing another exemplary hollow-part formed portion taken along line XI-XI in FIG. 10B.

In the example shown in FIG. 11A, a hollow part Ha1 having a circular shape of a diameter R2 less than a width W4 of the coupling section 15 (R2<W4) is provided. In the example shown in FIG. 11B, a hollow part Ha2 having a crescent shape is provided. An opening portion of the hollow part Ha2 is opposed to the space layer S6. Stress generated by bending influences a center portion more than end portions in the width direction. Thus, the hollow part Ha2 formed in the crescent shape absorbs more stress at the center portion than the end portions. In the examples shown in FIG. 11C and FIG. 11D, each hollow part Ha3, Ha4 includes a plurality of circles. In the examples shown in FIG. 11C, the hollow part Ha3 includes a plurality of holes having a small diameter. Although the hollow part Ha3 in FIG. 11C includes nine holes arranged in a 3×3 matrix, the number and arrangement of holes can be determined optionally. In the example shown in FIG. 11D, the hollow part Ha4 includes a plurality of circles having different shapes. The number, shape, and arrangement of holes can be determined optionally.

Figure 12A:
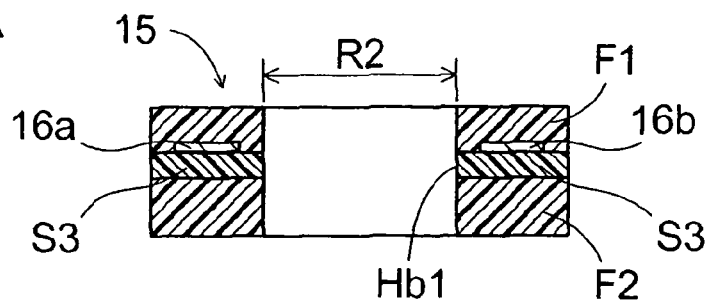
FIG. 12A is a cross-sectional view showing an exemplary hole-formed portion.
Figure 12B:
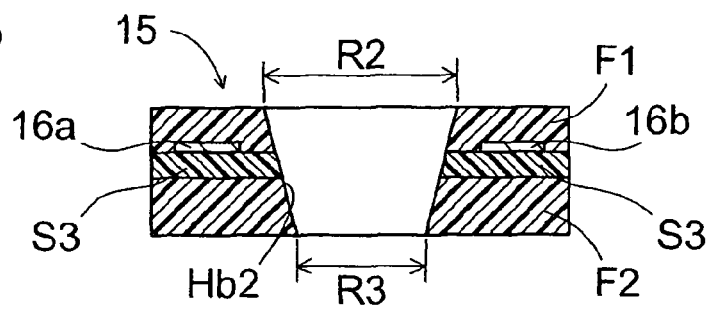
FIG. 12B is a cross-sectional view showing another exemplary hole-formed portion.
Figure 12C:
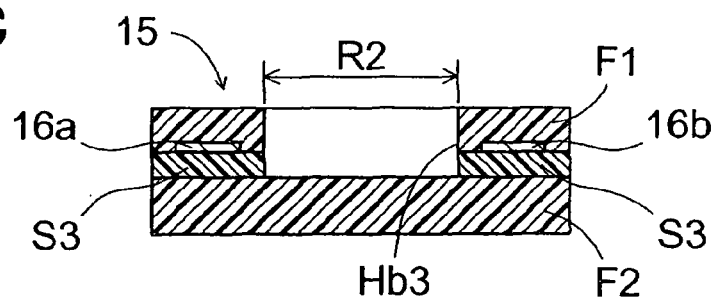
FIG. 12C is a cross-sectional view showing another exemplary hole-formed portion.
Figure 12D:
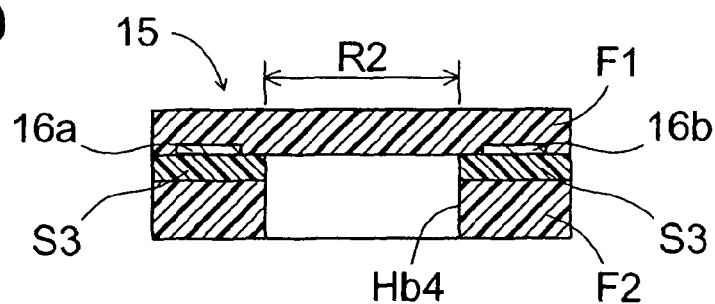
FIG. 12D is a cross-sectional view showing another exemplary hole-formed portion.

The hole formed portion 12p includes the hole Hb formed at a portion of the coupling section 15. The hole Hb may be one of a through hole and a blind hole such as a depression. Examples in which the hole Hb is a through hole are shown in FIG. 12A and FIG. 12B. Examples in which the hole Hb is a blind hole are shown in FIG. 12C and FIG. 12D. The hole Hb may have any planar shape such as a polygonal shape (greater than triangle) and a circular shape including an ellipse and a crescent. Examples in which the hole Hb has a circular shape are shown in FIG. 12A to FIG. 12D.

In the example shown in FIG. 12A, a through hole Hb1 having a constant diameter R2 is provided. In the example shown in FIG. 12B, a through hole Hb2 having a circular truncated cone shape is provided. The through hole Hb2 has a diameter R2 on the upper surface of the covering member F1, the through hole Hb2 has a diameter R3 on the lower surface of the covering member F2, and R2>R3. A shape of a slanting surface can be determined optionally. For example, a segment in section may have a linear shape as shown in FIG. 12B, a segment in section may also have a non-linear shape such as a curved shape or a stepped shape. In the example shown in FIG. 12C, a blind hole Hb3 penetrating the covering member F1 and the spacer layer S3 is provided, and the covering member F2 has no hole. In the example shown in FIG. 12D, a blind hole Hb4 penetrating the spacer layer S3 and the covering member F2 is provided, and the covering member F1 has no hole.

In the present embodiment, the stress absorbing portion 12 absorbs stress generated at the bent portion 13 (the second bent portion) that is bent along the upper surface of the vehicle seat 30 and the through hole 31b. Thus, even when stress is generated at not only the first bent portion but also the second bent portion, the stress absorbing portion 12 can absorb the stress. Therefore, a plurality of stresses generated at a plurality of bent portion does not influence the sensor member 11. Thus, the accuracy (sensitivity) of the sensor member 11 is maintained, and damage of the sensor member 11 is restricted.

The bent portion 13 (the second bent portion) is located between the sensor members 11c, 11d (the sensor member 11) and the connector 14 (see FIG. 1A). The sensor member 11 located between the first bent portion and the second bent portion is subject to stress generated at the first bent portion and stress generated at the second bent portion. By the present configuration, even when stress is generated at bending at the first bent portion and the second bent portion, the stress absorbing portion 12 absorbs the stress. Thus, the stress generated at the first bent portion and the stress generated at the second bent portion do not influence the sensor members 11c, 11d. Thus, the accuracy (sensitivity) of the sensor members 11c, 11d are maintained, and damage of the sensor members 11c, 11c is restricted.

The stress absorbing portion 12 includes the hole Hb or the hollow part Ha provided at a portion of the covering members F1, F2 (see FIG. 10A to FIG. 12D). The stress absorbing portion 12 including the hole Hb or the hollow part Ha absorbs stress generated by bending. Because the stress absorbing portion 12 has a simple configuration, a manufacturing cost can be restricted. The stress absorbing portion 12 may also include one or more of the hollow part Ha, the hole Hb, and the slit-formed portions 12c, 12d described in the second embodiment.

The coupling section 15 includes the covering member F1 (the first film member) that covers the first surface of the sensor member 11, the covering member F2 (the second film member) that covers the second surface of the sensor member 11 and the spacer layer S3 (the intermediate film member) that is disposed between the covering member F1 and the covering member F2 (see FIG. 10B). The hollow part Ha is surrounded by the covering member F1, the covering member F2, and the through hole S3a provided in the spacer layer S3. When the coupling section 15 is bent, the covering member F1 and the covering member F2 deform in different manners. In other words, one of the film members extends and the other of the film members contracts, and thereby stress (for example, shear stress) is generated in the sensor member 11. In the present configuration, the stress generated by bending is absorbed by the hollow part Ha. Thus, the accuracy (sensitivity) of the sensor member 11 is maintained, and damage of the sensor member 11 is restricted.

The hole Hb may be the through hole Hb1, Hb2 penetrating the covering members F1, F2 (see FIG. 12A, FIG. 12B). Even when stress is generated by bending, the stress is absorbed by deformation of the through hole Hb1, Hb2. Thus, the accuracy (sensitivity) of the sensor member 11 is maintained, and damage of the sensor member 11 is restricted.

The coupling section 15 is disposed along the upper surface of the vehicle seat 30 and the through hole 31b (see FIG. 3). Even when stress is generated by bending the coupling section 15 along the upper surface of the vehicle seat 30 and the through hole 31b, the stress is absorbed by the stress absorbing portion 12. Thus, the accuracy (sensitivity) of the sensor member 11 is maintained, and damage of the sensor member 11 is restricted.

(Other Embodiments)

Although the present invention has been fully described in connection with the preferred embodiments thereof with reference to the accompanying drawings, it is to be noted that various changes and modifications will become apparent to those skilled in the art.

Figure 7C:
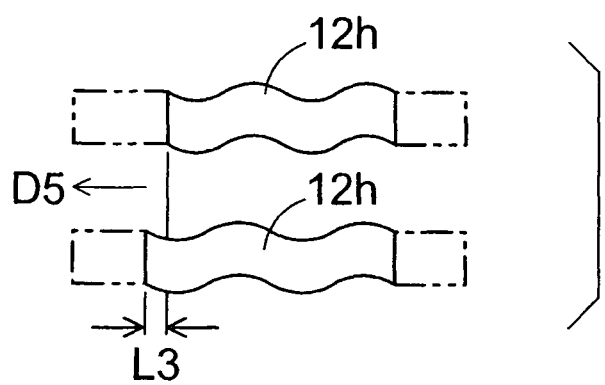
FIG. 7C is a diagram showing a change in the wavy portion in accordance with stress at a bent portion.

Each of the occupant detection sensors 10 according to the first to third embodiments includes the stress absorbing portion 12 between the sensor member 11b and the bent portion 13 (see FIG. 4A to FIG. 6D) The occupant detection sensor 10 according to the fourth embodiment includes the stress absorbing portion 12 between the bent portions 13 (see FIG. 7A to FIG. 7C). Each of the occupant detection sensors 10 according to the fifth and sixth embodiments includes the stress absorbing portion 12 in the sensor member 11 or the coupling section 15. The occupant detection sensor 10 according to the seventh embodiment includes the stress absorbing portion 12 between the sensor member 11d and the connector 14 (see FIG. 1A and FIG. 10A). Two or more of the first to seventh embodiments may be combined in one occupant detection sensor 10. In the present case, the occupant detection sensor 10 can achieve effects of corresponding embodiments.

Figure 13A:
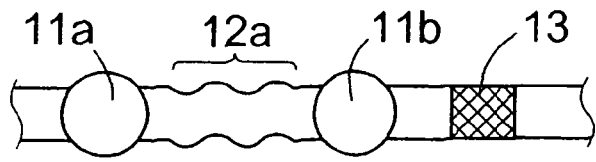
FIG. 13A is a plane view showing a coupling section including a stress absorbing portion according to another embodiment.
Figure 13B:
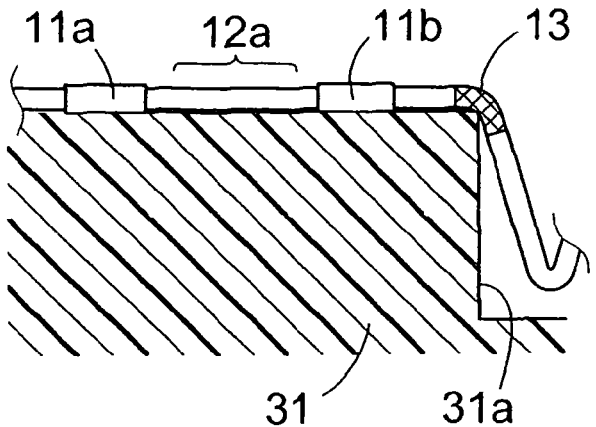
FIG. 13B is a side view showing the coupling section including the stress absorbing portion shown in FIG. 13A.

Instead of or in addition to the first to seventh embodiments, the stress absorbing portion may also be disposed between the sensor members 11. For example, as shown in FIG. 13A and FIG. 13B, the wavy portion 12a is formed at a portion or the whole of the coupling section 15 that couples the sensor member 11a and the sensor member 11b. Although the sensor member 11b is curved upward by being subjected to stress generated by bending of the bent portion 13, the curve is restricted by extension of the wavy portion 12a. In other words, stress generated by bending is not directly absorbed but is indirectly absorbed by displacement of other component (in the present case, the sensor member 11b). Instead of the wavy portion 12a, other stress absorbing portion 12 such as wavy portions 12b, 12h and the slit-formed portions 12c, 12d may also be formed. Also in the present case, effects similar to the effects of the first to seventh embodiments can be achieved.

Although the stress absorbing portion 12 is formed at a portion of the coupling section 15 in each of the first to fourth embodiments (see FIG. 4A to FIG. 7C), the stress absorbing portion 12 may also be formed at the whole of the coupling section 15. Although the stress absorbing portion 12 is formed at the whole of the sensor member 11 or the coupling section 15 in each of the fifth and sixth embodiments (see FIG. 8A to FIG. 9D), the stress absorbing portion 12 may also be formed only a portion of the sensor member 11 or the coupling section 15. In any embodiments, it is necessary to form the stress absorbing portion 12 in an enough range to absorb stress generated by bending of the bent portion 13. Accordingly, effects similar to the effects of the first to seventh embodiment can be achieved.

Figure 14A:
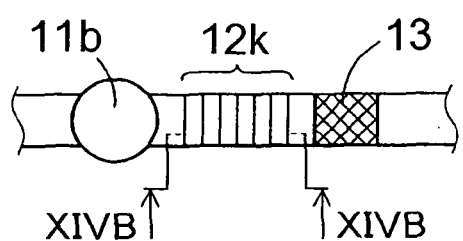
FIG. 14A is a plane view showing a coupling section including an exemplary groove-formed portion according to another embodiment.
Figure 14B:
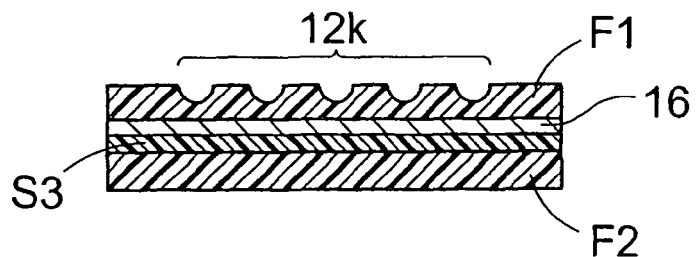
FIG. 14B is a cross-sectional view showing the coupling section taken along line XIVB-XIVB in FIG. 14A.
Figure 14C:
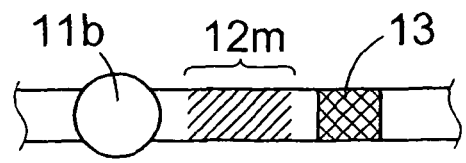
FIG. 14C is a plane view showing a coupling section including an another exemplary groove-formed portion.

In the fifth embodiment, the thickness T1 of the covering member F1 that is pulled due to bending of the bent portion 13 is less than the thickness T2 of the covering member F2 (see FIG. 8A and FIG. 8B). Instead of reducing the thickness of the whole of the covering member F1, a portion of the covering member F1 may include grooves on an upper surface side thereof. In the example shown in FIG. 14A and FIG. 14B, groove-formed portion 12k can serve as the stress absorbing portion 12, and the groove-formed portion 12k includes a plurality of grooves provided along the width direction of the covering member F1. In the example shown in FIG. 14B, each of the grooves has a semicircular shape in a cross section. However, each of the grooves may have other cross-sectional shape such as a semielliptical shape and a polygonal shape including a triangle and a pentagon. At portions where the grooves are provided, the thickness of the covering member F1 is reduced. Thus, the grooves-formed portion 12k can easily extend compared with the other portion of the covering member F1. Thus, stress generated by bending of the bent portion 13 can be absorbed by extension of the stress absorbing portion 12. On the other hand, because the grooves-formed portion 12k also has a flat portion where the grooves are not provided, a strength (rigidity) decrease can be restricted. The grooves may be provided in any direction. For example, in an example shown in FIG. 14C, a groove-formed portion 12m in which a plurality of grooves are provided in an oblique direction can function as the stress absorbing portion 12. Also in the present case, stress generated by bending of the bent portion can be absorbed by extension of the groove-formed portion 12m, effects similar to the effects of the fifth embodiment can be achieved.

In each of the first, second, and fourth embodiments, the occupant detection sensor 10 includes one stress absorbing portion 12 (see FIG. 4A to FIG. 5D and FIG. 7A to FIG. 7C. The occupant detection sensor 10 may also include two or more stress absorbing portion 12, for example, so as to correspond to the number of bent portion 13. In the present case, the stress absorbing portions 12 absorbs stresses generated by bending of the corresponding bent portions 13, effects similar to the effects of the first, second, and fourth embodiments can be achieved.

In each of the first to seventh embodiments, the stress absorbing portion 12 and the bent portion 13 are formed at different positions. The stress absorbing portion 12 and the bent portion 13 may overlap each other at a portion or a whole, that is, the stress absorbing portion 12 may also be formed to include the bent portion 13. In the present case, because stress generated at the bent portion 13 is absorbed by the stress absorbing portion 12 that overlaps the bent portion 13, stress does not influence to the other portion. Thus, effects similar to the effects of the first to seventh embodiments can be achieved.

In each of the first to seventh embodiments, the sensor member 11 used as a switch is a pressure sensor in which the spacer layer S3 is disposed between the first electrode (the silver layer S1 and the carbon layer S2) and the second electrode (the silver layer S5 and the carbon layer S4). The sensor member 11 may also have other configuration. For example, the sensor member 11 may a piezoelectric element, a strain gage, or a semiconductor pressure sensor. Also when the sensor member 11 has the above-described configuration, the sensor member 11 can function as a switch. Thus, effects similar to the effects of the first to seventh embodiments can be achieved.

In each of the first to seventh embodiments, the occupant detection sensor 10 is a load sensor that detects sitting of an occupant by receiving a load of the occupant. The occupant detection sensor 10 may also be a capacitive sensor that detects sitting of an occupant and a physical frame of an occupant based on change in capacity. Even if the capacitive sensor is bent and stress is generated, the stress can be absorbed by the stress absorbing portion 12. Thus, the accuracy (sensitivity) of a sensor member is maintained, and damage of the sensor member is restricted.

In each of the first to seventh embodiments, the occupant detection sensor 10 is disposed along the hanging groove 31a (see FIG. 1D, FIG. 4B, and FIG. 5B). As shown in FIG. 3A, two or more occupant sensors 10 may also be disposed along two or more hanging grooves 31a. When the vehicle seat 30 has two or more hanging grooves 31a, two or more stress absorbing portion may also be provided to correspond to the hanging grooves 31a. Accordingly, stress generated at each bent portion 13 can be absorbed with certainty, effects similar to the effects of the first to seventh embodiments can be achieved.

Figure 15A:
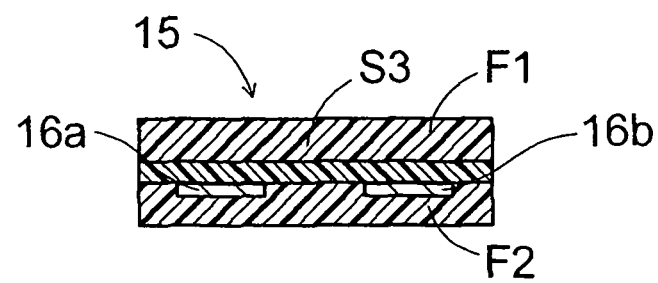
FIG. 15A is a cross-sectional view showing a coupling section according to another embodiment.
Figure 15B:
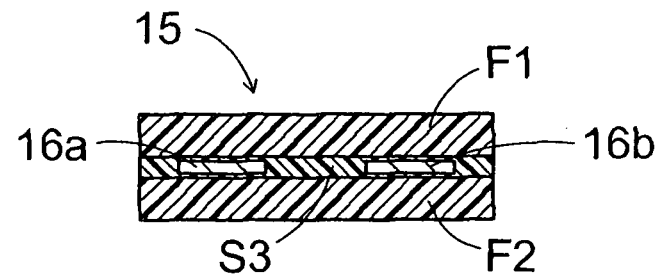
FIG. 15B is a cross-sectional view showing a coupling section according to another embodiment.
Figure 15C:
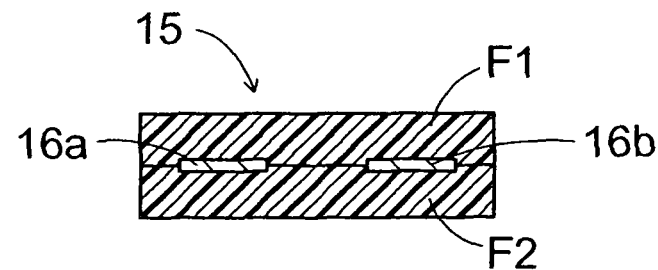
FIG. 15C is a cross-sectional view showing a coupling section according to another embodiment.

In each of the first to seventh embodiments, the coupling section 15 has a configuration in which the wiring members 16 (16a, 16b) and the spacer layer S3 are disposed between the covering members F1, F2 so that the covering members F1, F2 covers both the wiring members 16 and the spacer layer S3. The coupling section 15 may also have other configuration, for example, as shown in FIG. 15A to FIG. 15C. In an example shown in FIG. 15A, the wiring members 16a, 16b are disposed between the spacer layer S3 and the covering member F2. In an example shown in FIG. 15B, the wiring members 16a, 16b are disposed in the spacer layer S3. The wiring members 16a, 16b may also be disposed in one of the covering members F1, F2 although the present configuration is not shown. In an example shown in FIG. 15C, the spacer layer S3 is not disposed, and the wiring members 16a, 16b are disposed between the covering members F1, F2. In any of the above-described configurations, the occupant detection sensor 10 can detect sitting of an occupant and can transmit a signal through the wiring members 16a, 16b, and effects similar to the effects of the first to seventh embodiment can be achieved.

In the seventh embodiment, the hallow part Ha is surrounded by the covering members F1, F2 and the through hole S3a (see FIG. 10A to FIG. 11D). Instead of or in addition to the above-described embodiments, the hallow part Ha may also be a hollow part or a depressed part provided in at least one of the covering members F1, F2 and the through hole S3a, and hallow part Ha may also be a combination of the hollow part and the depressed part. Also in the present case, stress is absorbed by the hollow part Ha. Thus, effects similar to the effects of the seventh embodiment can be achieved.

In each of the first to seventh embodiments, the occupant detection sensor 10 is disposed on the upper surface of the cushion pad 31 of the vehicle seat 30. The occupant detection sensor 10 may also be disposed in a seat other than vehicle seat 30. For example, the occupant detection sensor 10 may be disposed in a massage chair or a body pressure measuring apparatus for sports or medical application. The occupant detection sensor 10 can detect sitting and can be applied to a case where design and comfortableness are needs to be improved.

What is claimed is:

1. An occupant detection sensor comprising:
   a sensor member disposed on a surface of a vehicle seat and detecting sitting of an occupant;
   a wiring member electrically coupling the sensor member with an external device; and
   a covering member covering the sensor member and the wiring member,
   wherein the wiring member and the covering member are included in a coupling section that is disposed along the surface of the vehicle seat,
   wherein the coupling section includes a bent portion and a stress absorbing portion;
   wherein the bent portion is bent along a hanging groove or a through hole provided on the surface of the vehicle seat, and
   wherein the stress absorbing portion is disposed between the bent portion and the sensor member and absorbs stress generated at the bent portion.

2. The occupant detection sensor according to claim 1, wherein the bent portion is a first bent portion and the coupling section further includes a second bent portion located at a position different from the first bent portion, and
   wherein the stress absorbing portion absorbs stress generated at the first bent portion and stress generated at the second bent portion.

3. The occupant detection sensor according to claim 2, further comprising
   a connector electrically coupling the sensor member and the external device,
   wherein the second bent portion is located between the sensor member and the connector.

4. The occupant detection sensor according to claim 1, wherein the stress absorbing portion includes at least one of a slit formed at a portion of the covering member, a hole, and a hollow part.

5. The occupant detection sensor according to claim 4, wherein the sensor member includes a first surface and a second surface opposed to each other,
   wherein the covering member includes a first film member and a second film member, the first film member covers the first surface of the sensor member and the second film member covers the second surface of the sensor member,
   wherein the coupling section further includes an intermediate film member disposed between the first film member and the second film member, and the intermediate film member has a hole, and
   wherein the stress absorbing portion includes the hollow part, and the hollow part is defined by the first film member, the second film member, and the hole of the intermediate film member.

6. The occupant detection sensor according to claim 4, wherein the stress absorbing portion includes the hole, and the hole is a through hole penetrating the covering member.

7. The occupant detection sensor according to claim 1, wherein the stress absorbing portion includes a wavy portion that is curved in one direction.

8. The occupant detection sensor according to claim 7, wherein the wavy portion has a width less than a width of the sensor member.

9. The occupant detection sensor according to claim 1, wherein the sensor member includes a first surface and a second surface opposed to each other,
   wherein the covering member includes a first film member and a second film member, the first film member covers the first surface of the sensor member and the second film member covers the second surface of the sensor member, and
   wherein the first film member is thinner than the second film member in the stress absorbing portion.

10. The occupant detection sensor according to claim 1, wherein the sensor member includes a first surface and a second surface opposed to each other,
    wherein the covering member includes a first film member and a second film member, the first film member covers the first surface of the sensor member and the second film member covers the second surface of the sensor member, and
    wherein one or both of the first film member and the second film member includes an elastic-body formed portion in the stress absorbing portion, and
    wherein the elastic-body formed portion is made of soft resin having a rigidity lower than a rigidity of the other portion of the first film member and the second film member.

11. The occupant detection sensor according to claim 1, further comprising one or more sensor members,
    wherein the sensor members are linearly arranged.

12. The occupant detection sensor according to claim 1, wherein the sensor member detects sifting of the occupant by being subjected to a load due to the sitting of the occupant.

13. A method of manufacturing an occupant detection sensor comprising:
    forming a sensor member on a surface of a vehicle seat that detects sitting of an occupant;
    forming a connector electrically coupling the sensor member with an external device;
    wiring the sensor member and the connector with a wiring member; and
    covering the sensor member and wiring member with a covering member and forming a stress absorbing portion in a whole or a portion of a coupling section that includes the wiring member and the covering member located between the sensor member and the connector, wherein the stress absorbing portion is formed to absorb stress generated by bending of a portion of the coupling section;

wherein the portion of the coupling device that is bent, is bent along a hanging groove or a through hole provided on the surface of the vehicle seat; and wherein the stress absorbing portion is disposed between the portion of the coupling device that is bent and the sensor member and the absorbs stress generated at the portion of the coupling device that is bent.

14. The method of manufacturing according to claim 13, wherein the stress absorbing portion extends over more than three quarters of a distance between the portion of the coupling device that is bent and the sensor member.

15. The method of manufacturing according to claim 13, wherein the stress absorbing portion extends in length to absorb the stress.

16. The occupant detection sensor according to claim 1, wherein the stress absorbing portion extends over more than three quarters of a distance between the bent portion and the sensor member.

17. The occupant detection sensor according to claim 1, wherein the stress absorbing portion extends in length to absorb the stress.

* * * * *